No. 835,853. PATENTED NOV. 13, 1906.
G. E. FRANQUIST.
THRUST BEARING.
APPLICATION FILED JUNE 24, 1905.
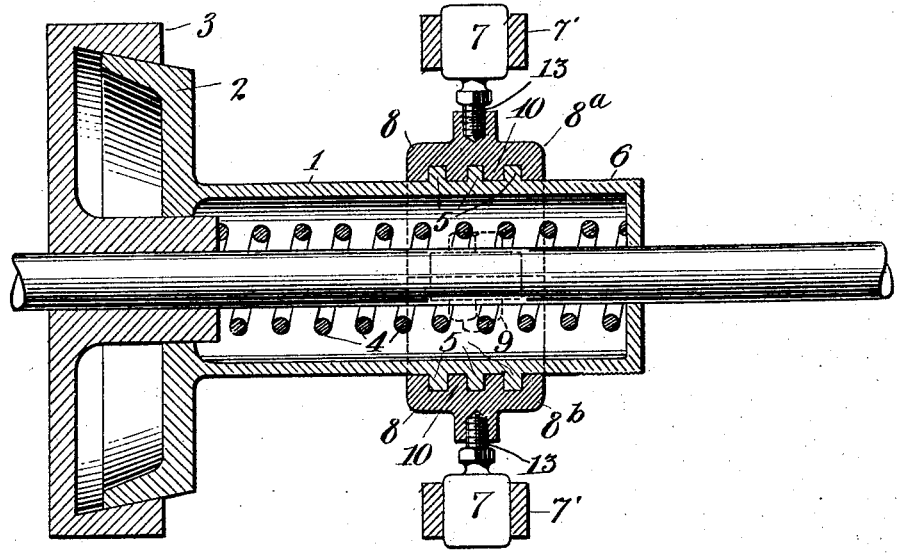

UNITED STATES PATENT OFFICE.

GUSTAVE EDWARD FRANQUIST, OF NEW YORK, N. Y.

THRUST-BEARING.

No. 835,853.  Specification of Letters Patent.  Patented Nov. 13, 1906.

Application filed June 24, 1905. Serial No. 266,750.

*To all whom it may concern:*

Be it known that I, GUSTAVE EDWARD FRANQUIST, a citizen of the United States, residing at the city of New York, in the borough of Manhattan and State of New York, have invented certain new and useful Improvements in Thrust-Bearings, of which the following is a full, clear, and exact description.

My invention relates to a thrust-bearing.

For the purpose of shifting in and out the clutches of motor-vehicles and other machinery a thrust-bearing is ordinarily required. The different conditions which arise in practice necessitate different forms of thrust-bearing, and it has hitherto been impossible to combine all the advantages of the so-called "marine-thrust" bearing with the advantages of a ball-bearing construction. For some purposes the marine thrust is desirable and for other purposes the ball-bearing thrust should be used, and it frequently happens that in the same machine conditions at one time will require a marine-thrust and at other times a ball-bearing-thrust connection.

It is the purpose of my invention to enable the foregoing desideratum to be obtained and to provide a device which shall be simple and easy to construct, convenient in operation, and having a minimum number of parts.

With these and other objects in view my invention consists in the construction, combination, location, and arrangement of parts, all as will be more fully hereinafter set forth, as shown in the accompanying drawing, and finally pointed out in the appended claims.

In the drawing I have illustrated a construction of thrust-bearing embodying the principles of my invention.

It is to be understood that the term "marine" thrust as ordinarily employed and herein used is merely the name of a particular type of thrust-bearing in which annular rings engage correspondingly-formed recesses in the journal-box. The use of this term is not intended to limit or pertain specially to the thrust-bearing for a marine propeller, although such use, of course, is included within the scope of the invention.

Referring now to the drawing, and to the reference-signs appearing thereon, in which like parts are designated by the same reference-signs wherever they occur, 1 designates what I term a "rotatable-shaft" connection and comprises any rotatable part to which it may be necessary to impart a longitudinal shifting movement or retain in rotatable relation against a tendency to longitudinal shift. For the purpose of illustration I have shown this rotatable-shaft connection as part of a friction-clutch having opposed cone-faces 2 and 3 of the usual or any desired form, which are required to be shifted longitudinally with relation to one another. In the diagrammatic illustration adopted the friction-clutch is of the form adapted to be spring-pressed into engagement and positively moved out of clutch relation and for this purpose includes a spring 4, which is tensioned to bear at any suitable point upon the rotatable-shaft connection 1 and spring-press the same to cause the cone-surfaces 2 and 3 to engage one another. The rotatable-shaft connection has upon it the thrust-bearing which embodies the principles of my invention and which is adapted to shift the rotatable-shaft connection longitudinally against the spring 4, so as to engage the surfaces 2 and 3. It is to be understood that this application of my invention is merely for the purpose of illustration.

5 indicates annular ribs upon the rotatable-shaft connection 1, which are preferably integral therewith and spaced apart to form recesses therebetween, preferably of a width slightly greater than the width of the annular ribs, although this is not essential. At a point in the vicinity of the annular ribs 5 I have arranged a fastening means 6, which I have shown in the form of a screw-thread adapted to engage any suitable threaded collar.

7 indicates trunnions, which are socketed in a support 7'. These trunnions, together with their support, constitute a pressure or thrust receiving member. This thrust-receiving member is a permanent part of the machine in which it is organized, together with the rotatable-shaft connection 1. Both of these parts are incorporated and combined into the surrounding structure in such a way that they cannot be conveniently removed, and in accordance with my present invention they are not required to be removed for the purpose of changing from a marine to a ball bearing thrust, and conversely. The interchangeable elements are included wholly within certain intermediate parts, which I will now particularly describe.

8 indicates a ribbed ring or collar forming a bearing for the rotatable-shaft connection 1. This part is adapted to constitute the marine-thrust block, and in a practical construction I form the same of a pair of semicircular sections 8ª and 8ᵇ, which can be bolted together by means of bolts 9, so as to inclose the rotatable-shaft connection 1.

10 indicates internal ribs upon the ribbed ring or collar 8, which are of a form to snugly engage the recesses between the ribs 5 above described.

At suitable points upon the exterior surface of the ribbed ring or collar 8 I arrange connections for the thrust-receiving member, and I have shown these connections in the form of threaded openings in the part 8, which may engage correspondingly-threaded studs 13 upon the trunnions 7. The studs 13 can be integral upon the trunnions 7, if desired, or they can be rotatably and slidably journaled in the trunnions, so as to permit being screwed into the recesses 12, where they may afterward be firmly held by set-screws, if desired.

When it is desired to remove the thrust-bearing, the trunnions 7 are turned in their supports 7', so that the threaded studs 13 are insulated from the bearing-blocks. The bearing-blocks are then freely removable from the hollow shaft 1. This arrangement not only enables the bearing-surfaces to be inspected and cleaned, but permits the substitution of a different kind of bearing in place of the form shown.

What I claim is—

1. In a thrust connection, a rotatable hollow shaft, a spring therein tending to press the same axially, there being spaced circumferential ribs on said shaft, a two-part collar having internal ribs engaging the ribs on said shaft and having diametrically-opposed threaded holes, and trunnions opposite said holes, said trunnions having threaded studs to engage the same.

2. In a thrust connection, a rotatable hollow shaft, spring means for pressing the same axially, there being spaced circumferential ribs on said shaft, a two-part collar having internal ribs engaging the ribs of said shaft, bolts for securing the parts of said collar together, said collar having diametrically-opposed threaded holes, trunnions opposite said holes and having threaded studs to engage the same, and supports in which said trunnions are longitudinally and rotatably movable.

In witness whereof I subscribe my signature in the presence of two witnesses.

GUSTAVE EDWARD FRANQUIST.

Witnesses:
FRANK S. OBER,
WALDO M. CHAPIN.